(12) United States Patent
Laksman et al.

(10) Patent No.: US 9,515,884 B2
(45) Date of Patent: Dec. 6, 2016

(54) SYSTEM AND METHOD FOR EVALUATING COVERAGE OF SERVICES BY COMPONENTS OF AN IT INFRASTRUCTURE

(75) Inventors: Ofer Laksman, Yavne (IL); Tsafrir Lahav, Nes-Ziyyona (IL); Vladimir Lyubarsky, Rehovot (IL); Oleg Kovalev, Rehovot (IL); Gregory Kovalev, Rishon Lezion (IL)

(73) Assignee: I.T. ANALYZER LTD., Nes-Ziona (IL)

( * ) Notice: Subject to any disclaimer, the term of this patent is extended or adjusted under 35 U.S.C. 154(b) by 26 days.

(21) Appl. No.: 13/612,534

(22) Filed: Sep. 12, 2012

(65) Prior Publication Data

US 2013/0067075 A1  Mar. 14, 2013

Related U.S. Application Data

(60) Provisional application No. 61/534,573, filed on Sep. 14, 2011.

(51) Int. Cl.
 *G06F 15/173* (2006.01)
 *H04L 12/24* (2006.01)

(52) U.S. Cl.
 CPC ....... *H04L 41/0893* (2013.01); *H04L 41/5009* (2013.01)

(58) Field of Classification Search
 CPC ............. H04L 12/1407; H04L 41/0813; H04L 41/0893; H04L 41/0803; H04L 41/0806; H04L 41/0856; H04L 41/0869; H04L 41/5054; H04L 43/00; H04L 63/1416; H04L 63/101; H04L 63/20; H04L 67/1097; H04L 2463/114; H04W 4/001; H04M 15/66; G06F 11/0727; G06F 11/0781; G06F 11/14; G06F 17/30067; G06F 17/30289; G06N 5/025; Y10S 707/959
 USPC ... 709/221–226; 726/23; 707/654, 674, 726, 707/770, 827; 703/20–23; 711/5
 See application file for complete search history.

(56) References Cited

U.S. PATENT DOCUMENTS

| | | | |
|---|---|---|---|
| 7,219,189 B1 * | 5/2007 | Ryu | G06F 3/0605 709/223 |
| 7,403,987 B1 * | 7/2008 | Marinelli | H04L 43/0817 707/999.202 |
| 7,496,551 B1 * | 2/2009 | Jalagam | G06N 5/04 706/47 |
| 7,809,667 B1 * | 10/2010 | Yehuda et al. | 706/47 |

(Continued)

OTHER PUBLICATIONS

Data Protection Advisor Automated Analysis and Alerting for Backup and Replication Infrastructure http://www.emc.com/backup-and-recovery/data-protection-advisor/data-protection-advisor.htm © EMC Corporation; Retrieved from the Internet on Sep. 11, 2012.

(Continued)

*Primary Examiner* — Oscar Louie
*Assistant Examiner* — Da T Ton
(74) *Attorney, Agent, or Firm* — Pearl Cohen Zedek; Latzer Baratz LLP

(57) ABSTRACT

Embodiments of the invention provide a system and method of evaluating compliance by components of an IT computer infrastructure with a policy by comparing a recipient component of a service that is identified by a component providing such service, to an identity of a component providing such service that is identified by a component receiving of such service.

18 Claims, 10 Drawing Sheets

(56) References Cited

U.S. PATENT DOCUMENTS

| | | | | |
|---|---|---|---|---|
| 2005/0185597 A1* | 8/2005 | Le | .................. | H04L 41/0866 |
| | | | | 370/254 |
| 2006/0184650 A1* | 8/2006 | Abali | .................. | G06F 8/60 |
| | | | | 709/220 |
| 2009/0254645 A1* | 10/2009 | Haustein | .................. | G06F 3/0686 |
| | | | | 709/223 |
| 2012/0084261 A1* | 4/2012 | Parab | .................. | G06F 11/1464 |
| | | | | 707/654 |
| 2012/0117530 A1* | 5/2012 | Green | .................. | 716/139 |

OTHER PUBLICATIONS

SANscreen Service Insight http://www.netapp.com/us/products/management-software/sanscreen/ © 2012 NETAPP; Retrieved from the Internet on Sep. 11, 2012.
EMC Ionix ControlCenter Software Family Part of the Lonix Storage ReSource Management Family pp. 1-6 WWW.EMC.com EMC Corporation MA; Published on May 2009.

* cited by examiner

| Rule | Policy | Provider | Recipient |
|---|---|---|---|
| I | All Servers Should be recorded in a backup system | Back Up Systems 110 | Servers 102 |
| I A | Files in any Server should have at least one backup | Back Up Systems 110 | Files in Servers 102 |
| II | Each Server should be connected to at least 2 switches | Servers 102 | Switches 106 |
| III | All HBAs 103 should be in use | HBAs 103 | Switches 106 |
| IV | Storage Arrays 104 should be connected to at least 2 Switches 106. | Storage Ports 105 | Switches 106 |
| V | Each Storage Device 150 should be mapped to at least one Storage Port 105 & masked to at least one HBA 103 | Storage Device 150 | Storage Port 105 |
| VI | Each storage device 150 presented to specific server 102 should be presented through at least 2 HBAs. | Storage Device 150 | HBAs 103 |
| VII | Each Zone 140 should include only active elements (Storage Ports 105 & HBAs 103) which have a connection path between them. | Zones 140 | Members (Storage Ports 105 & HBAs 103) |
| VIII | Each elements (HBA 103 or Storage Port 105) connected to Switch 106 should be part of existing Zone 140. | HBAs 103, Storage Ports 105 | Zones 140 |

| Server |
|---|
| 102A |
| 102B |
| 102C |

FIG. 3B

| Back Up System | Server |
|---|---|
| 110A | 102A |
| 110B | 102C |

FIG. 3C

| Discrepancies |
|---|
| Server 102B not backed up |

FIG. 3D

| Server | Files Systems |
|---|---|
| 102A | 101A,101D |
| 102B | 101B, 101E |
| 102C | 101F,101G,101C |

FIG. 3E

| BUSYS | File System |
|---|---|
| 110A | 101A,101D |
| 110B | 101C, 101F, 101G |
|  |  |
|  |  |

FIG. 3F

| Server | Discrepancies |
|---|---|
| 102B | File Systems 101B, 101E are not backed up |
| 102C | File System 101C is not backed up |

FIG. 4A

| Server | Switch |
|---|---|
| 102A | 106A |
| 102B | 106A, 106B |
| 102C | 106B |

FIG. 4B

| Switch | Server |
|---|---|
| 106A | Port 108A, HBA103A, Server102A; Port 108B, HBA103C, Server 102B |
| 106B | Port 108C, HBA 103D, Server 102B |
| 106B | Port 108K, HBA 103E, Server 102C |
| 106B | Port 108D, HBA 103F, Server 102C |

FIG. 4C

| Server | Discrepancies |
|---|---|
| 102A | Connected to only one switch 106A. |
| 102C | Connected to only one switch 106B |

FIG. 5A

| Server | HBA |
|---|---|
| 102A | 103A,103B |
| 102B | 103C,103D |
| 102C | 103E,103F |

FIG. 5B

| Switch | Element(HBA, Storage Port) |
|---|---|
| 106A | 103A,103C,105A |
| 106B | 103D,103E,103F,105B,105C,105D |

FIG. 5C

| HBA | Discrepancies |
|---|---|
| 103B | Not connected to any switch |

FIG. 6A

| Storage Array | Storage Port / Port |
|---|---|
| 104A | 105A, Port, 108E. switch 106A<br>105B, Port 108G, switch 106B |
| 104B | 105C, Port 108L, switch 106B<br>105D, Port 108H, switch 106B |

FIG. 6B

| Storage Array | Discrepancies |
|---|---|
| 104B | Connected to only one switch 106B |

FIG. 7A

| Storage Device | Map Storage Port | Mask HBA |
|---|---|---|
| 150A | NO MAP | 103D,103E,103F |
| 150B | 105C | 103D,103E,103F |
| 150C | 105C,105D | 103A – 103F |
| 150D | 105A,105B | 103A – 103F |
| 150E | 105A | 103D,103E,103F |
| 150F | 105A, 105B | 103A – 103F |

FIG. 7B

| Storage Device | Discrepancies |
|---|---|
| 150A | Device masked but no mapped |
| 150C | 1. Masked to not connected HBA 103B<br>2. Masked to HBA 103A, 103C which don't have a connection path to the storage ports the device mapped to (105C,105D) |
| 150D | Masked to not connected HBA 103B |
| 150E | Masked to HBA 103D, 103E, 103F which don't have a connection path to the storage port the device mapped to (105A) |
| 150F | Masked to not connected HBA 103B |

FIG. 8A

| Server | HBA |
|---|---|
| 102A | 103A,103B |
| 102B | 103C,103D |
| 102C | 103E,103F |

FIG. 8B (Rule VI, Rule V, Rule III & Rule IV Cross Check)

| Storage Device | Discrepancies |
|---|---|
| 150B | Presented just once on server 102B. |
| 150C | Presented just once on server 102B. |
| 150D | Presented just once on server 102A. |
| 150F | Presented just once on server 102A. |

FIG. 9A (Rule VII Check)

| Zone | Members |
|---|---|
| 140A | 105B, 103F |
| 140B | 105B, 103E |
| 140C | 105A, 103F |
| 140D | 105A, 103E |
| 140E | 105A, 103B |

FIG. 9B (Rule VII, Rule III, Rule VI & Rule VIII Cross Check)

| Element | Discrepancies |
|---|---|
| Zone 140 C | Members (103F & 105A) don't have a connectivity path between them |
| Zone 140 D | Members (103E & 105A) don't have a connectivity path between them |
| Zone 140 E | Member 103B is NOT connected |
| HBA 103A | HBA is connected but is not member in any zone |

FIG. 10A (Rule VIII Check)

| Element | Zone |
|---|---|
| 103F | 140A, 140C |
| 103E | 140B, 140E |
| 103B | 140E |
| 103A | NO ZONE |
| 105B | 140A, 140B |
| 105A | 140C, 140D, 140E |

SYSTEM AND METHOD FOR EVALUATING COVERAGE OF SERVICES BY COMPONENTS OF AN IT INFRASTRUCTURE

CROSS REFERENCE TO RELATED APPLICATIONS

This application claims the benefit of U.S. Provisional Application No. 61/534,573 filed on Sep. 14, 2011 entitled "System and Method for Cross Platform Collection of IT Infrastructure Objects and Analyzing IT Using Cross Analysis Rule Base", which is incorporated herein by reference in its entirety.

FIELD OF THE INVENTION

This application relates to evaluating usage of services provided by components of a computer information technology (IT) infrastructure to other components of the IT infrastructure, and particularly to evaluating the extent to which components of an IT infrastructure are actually providing and receiving the services that are indicated as being provided or received.

BACKGROUND OF THE INVENTION

The complexity, specificity, inter-relatedness and remote locations of components in a IT infrastructure, complicates the managing and tracking of services and coverage provided by such components. Data may be stored in a first server in a first location, backed up by a storage device in a second location, and transferred via a switch in a third location. An IT officer or management system may receive indications of a connection of some or all of the components or objects and their interconnections, and may receive an indication of which objects are providing which services to which other objects, from the objects themselves, but may lack a capacity to confirm the provision and receipt of services and connections between the objects.

SUMMARY OF THE INVENTION

Embodiments of the invention may include a system and method for evaluating compliance with a policy for a service provided by objects on a network infrastructure, where such method includes comparing an indication or identity of a component that is a target or recipient of the service, as such identity is supplied or indicated by the component that is the supplier of such service, to an indication or identity of a component that is a provider of the service, where such identity or indication is provided by a target or recipient of the service. An embodiment may continue to evaluate the comparison against a policy for the service on a network infrastructure.

Embodiments of the invention may include a system and method for evaluating a service provided by a component of a computer infrastructure, including building, populating or compiling a list of a first set of objects or components that providing a service on the infrastructure. An embodiment may continue to compile a second list of a second set of objects, that includes objects that receive the service. A list of associations or links may be complied that includes or connects the target object of the service provided by a particular object in the first set of objects to a particular object in the second set. For example, an association could be an identity of a server object that is the recipient of a switching service from a particular switch, to show both the provider of the service and the intended target or recipient of the service. An embodiment may continue to compile a second set of associations that include or list the identity of a recipient of a service and the identity of the component providing such service to the recipient. An embodiment may continue to compare the lists of associations to determine whether the first set of associations match the second set of associations, and to determine whether a particular first component that indicates is providing a service to a particular second component, is in fact providing the service to such particular component and that the particular component is receiving such service from it. Such determination may be part of an evaluation of a compliance of the relationship between components, connections or services with a predefined policy.

Embodiments of the invention may include a system and method for visually depicting a compliance with a policy by components on an IT infrastructure, where including depicting in a first format a visible connection between a first component of a first class of objects and a first component of a second class of objects, where the first format of visible connection signifies or represents a service being provided by the first component of the first class to the first component of the second class. An embodiment may continue to depicting in a second format, a visible connection between the first component of the second class of objects and the first component of the first class of objects, where the second format of visible connection signifies or represents the service being received by the first component of the second class from the first component of the first class. An embodiment may further include depicting in a third format a visible connection between the first component of the first class and the first component of the second class, where the third format of visible connection signifies that a service being provided by the first component of the first class to the first component of the second class matches a service indicated as being received by the first component of the second class from the first component of the first class.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 2 is a list of policies that may govern or relate to connections, services and practices between and among members of categories of IT objects, in accordance with an embodiment of the invention; and FIG. 3A is a table identifying members of a set, class or category of server objects of the IT infrastructure that are to receive a backup service from members of the back up system class of objects in accordance with an embodiment of the invention;

FIG. 3B is a table identifying members of a class or category of back up system objects of the IT infrastructure that are to provide backup services to members of a server class of objects in accordance with an embodiment of the invention;

FIG. 3C is a table identifying discrepancies from Rule 1 as is shown in FIG. 2;

FIG. 3D is a table identifying members of a class or category of server objects of the IT infrastructure, and members of a class or category of file systems (FS) on such servers, in accordance with an embodiment of the invention;

FIG. 3E is a table identifying members of a class or category of backup systems of the IT infrastructure and members of the class or category of file systems on servers that receive back up services from such backup systems, in accordance with an embodiment of the invention;

FIG. 3F is a table identifying discrepancies from Rule 1a as is shown in FIG. 2;

FIG. 4A is a table identifying members of a class or category of server objects of the IT infrastructure that receive connection services from a class or category of switches of the IT infrastructure in accordance with an embodiment of the invention;

FIG. 4B is a table identifying members of a set, class or category of switch objects of the IT infrastructure that provide connection services to a class or category of servers of the IT infrastructure in accordance with an embodiment of the invention;

FIG. 4C is a table identifying discrepancies from Rule II as is shown in FIG. 2;

FIG. 5A is a table identifying members of a set, class or category of servers of the IT infrastructure that provide in-use connection services to a class or category of host bus adaptor objects of the IT infrastructure in accordance with an embodiment of the invention;

FIG. 5B is a table identifying members of a class or category of switch objects and server objects respectively of the IT infrastructure that provide in-use connection services to a class or category of host bus adaptor objects of the IT infrastructure in accordance with an embodiment of the invention;

FIG. 5C is a table identifying discrepancies from Rule III as is shown in FIG. 2;

FIG. 6A is a table identifying members of a set, class or category of storage arrays of the IT infrastructure that provide in-use connection services to members of a class or category of ports of a switch and storage port objects of the IT infrastructure in accordance with an embodiment of the invention;

FIG. 6B is a table providing a cross check of Rule III and Rule IV, and identifying discrepancies from such rules as are shown in FIG. 2, in accordance with an embodiment of the invention;

FIG. 7A is a table identifying members of a set, class or category of storage devices of the IT infrastructure that provide mapping and in-use connection services to members of a class or category of storage port objects and masking and in-use connection services to members of a class or category of HBA's of the IT infrastructure in accordance with an embodiment of the invention;

FIG. 7B is a table providing a cross check of Rules III, IV and V as are shown in FIG. 2 and identifying discrepancies from such policies in accordance with an embodiment of the invention;

FIG. 8A is a table identifying members of a set, class or category of servers of the IT infrastructure that provide in-use connection services to members of a set, class or category of host bus adaptor objects of the IT infrastructure in accordance with an embodiment of the invention;

FIG. 8B is a table providing a cross check of Rules III, IV, V and VI as are shown in FIG. 2, and identifying discrepancies from such policies in accordance with an embodiment of the invention;

FIG. 9A is a table identifying members of a set, class or category of fiber channel zones of the IT infrastructure that provide membership services to members of a set, class or category of host bus adaptors and storage ports objects of the IT infrastructure in accordance with an embodiment of the invention;

FIG. 9B is a table providing a cross check of Rules III, IV, VII and VIII as are shown in FIG. 2, policies and identifying discrepancies from such policies, in accordance with an embodiment of the invention;

FIG. 10 is a table identifying members of a set, class or category of host bus adaptors and storage ports of the IT infrastructure that provide connection services to members of a set, class or category of zone objects of the IT infrastructure in accordance with an embodiment of the invention;

DETAILED DESCRIPTION OF THE INVENTION

Figure 1A:
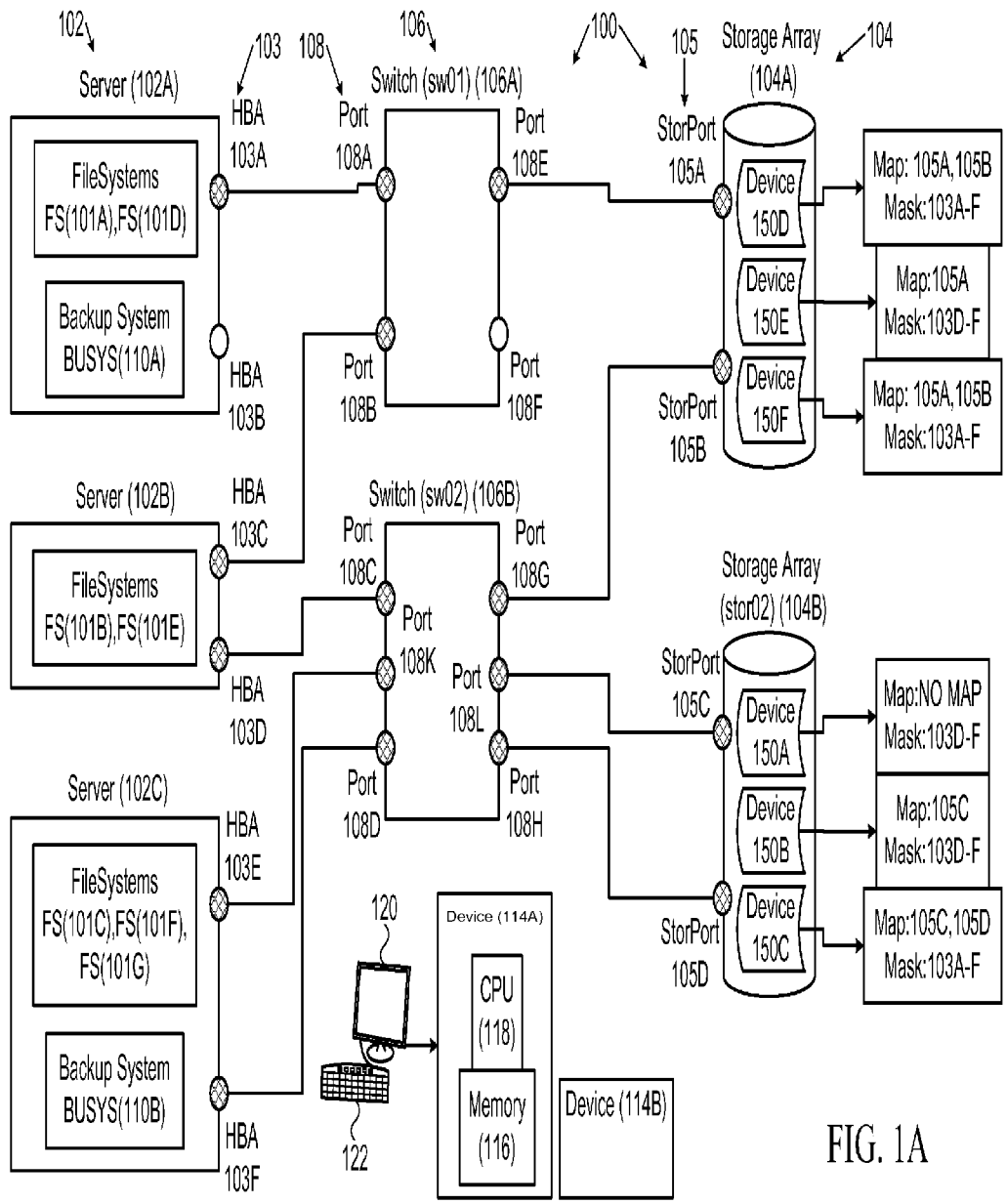
FIG. 1A is a schematic diagram of objects of an IT computer infrastructure and an indication of connections between one or more of such objects and of the services provided by certain of such objects to other objects, in accordance with an embodiment of the invention.

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, and components have not been described in detail so as not to obscure the embodiments of the invention.

Unless specifically stated otherwise, as apparent from the following discussions, it is appreciated that throughout the specification, discussions utilizing terms such as "selecting," "evaluating," "processing," "computing," "calculating," "associating," "determining," "comparing", "designating," "allocating" "compiling a list", "assemble a table" or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. In some embodiments, one or more methods of embodiments of the invention may be stored on an article such as a memory device, where such instructions, upon execution by for example a processor or group of processors, result in a method of an embodiment of the invention.

As used in this application, and in addition to its regular meaning, the term IT component or IT object may refer to one or more servers, data storage devices, backup systems, processors, ports, switches, servers, private branch exchange (PBX), or other electronic devices that may be connected to or accessible from a network (e.g., an electronic data network for sending or exchanging information) by other components, resources or objects that are connected to or accessible from or connected to a network. Sets, classes or categories of objects may not necessarily be represented by physical objects, but may include virtual or designated object such as a fiber channel zone, virtual local area network or other electronic designations of a user or members in a network or group of components. For example, a IT object may include a database stored in a memory or disk drive, a switch that may direct packets, a server that may retrieve and send data to and from a data storage device, a router, a hub, or one or more end user devices that may access or be accessed from one or more of the other IT objects. IT objects may be or include physical objects or virtual/logical objects such as virtual servers.

As used in this application, the term 'service' may in addition to its regular meaning, refer to a function, status, position or relationship between or among categories of IT objects or from and to particular members, entities or objects in a category of IT objects to other particular members, entities or objects in the same or another set or category of IT objects. For example, a switch may provide a switching service for data transferred between for example a storage and a server. A backup system may provide a backup service to for example a data base repository or to a server, which would be the target of such service. A port may provide a connectivity service between a device and one or more IT objects. A service may include an opportunity, path or means by which an object or component of a set of components satisfies a requirement of a policy to which it is subject. For example, a policy may dictate, require or indicate that a storage device is to be presented to a server by at least two host bus adaptors. In such case, a server may provide server services to the storage device which would be the target of the service, and the host bus adaptors provide presenting services to the connection or link of the storage device to the server, as a way for the connection of the storage device to satisfy its connectivity requirements with the server.

A particular object may be both a service provider and a recipient of a same or different service, such that an object can be a target of a service and a provider of a service. For example, a particular backup system that may include for example one or more backup devices such mass data storage units, a library, and software instructions operating the device and library, may be an object in a category of backup systems that may provide back up service, such as for example, duplication, replication and remote storage, to a particular server as target, but may be a recipient of backup services, such as redundancy backup services from another back up object in the category of backup systems. Such back up services may include the copying or duplication of data that is stored in one component onto another component. Services may also include a chain of services that may be provided by objects in two, three or more categories. For example, a server may deliver data via a switch to a backup system by way of a port, where the port is part of a chain of connectivity services to and from one or more components. In such cases a chain of service provider objects may contribute necessary services to a function of one or more other objects. In some embodiments, a service provided by or to an object may vary depending on a condition of the object. For example, a first quality of service to be provided to a first device may rely on a first server while a higher quality of service that may be demanded for the same or different device at a different time or for transmissions of other data may rely on a second or additional server. Other combinations and categories may be combined into sets or groups of service providers and recipients.

As used in this application, the term 'IT Infrastructure' or 'network infrastructure' may in addition to its regular meaning, include objects, components, links, connections, devices and instructions that may support the provision of services by a computer network or IT infrastructure.

Reference is made to FIG. 1A, a schematic diagram of categories of IT objects, members of such categories and services provided to and received by such objects in accordance with an embodiment of the invention. A system 100 or IT infrastructure may include for example one or more categories of servers 102, storage devices 104, switches 106, ports 108, backup systems 110 and other items that may be part of or connected to an IT infrastructure. A category or set of objects may have one or more components, member systems or member devices. For example, an IT infrastructure may include several servers 102A, 102B and 102C that may make up the set of servers 102 on the IT infrastructure. A category or set of storage arrays 104 may include storage devices 104A and 104B. Switches 106 may include switch 106A and switch 106B. Ports 108 may include port 108A, 108B, 108C, 108D etc. Back up systems (BUSYS) may include BUSYS 110A, 110B etc. Other categories, classes or sets of devices, components or objects may be included.

Devices 114 may include devices 114A and 114B. One or more devices 114B or other components may include one or more processors, such as a central processor 118, a memory 116 and one or more output devices such as a screen 120, and an input device such as a keyboard 122 or mouse. One or more of such devices 114 may store instructions that when executed may perform a method of an embodiment of the invention. Central processor 118 may perform methods according to embodiments of the present invention.

Reference is made to FIG. 2, a list of policies that may govern or relate to connections, services and practices among members of categories, in accordance with an embodiment of the invention. These policies and the related objects shown are provided for an example; other policies and objects may be used.

For example, a Policy I may indicate that a server from servers 102 should be known or recognized by, or registered or recorded in by or registered with at least one backup system from backup systems 110 that backs up data on or available to the server.

A corollary Policy Ia may indicate that a file stored on a server such as 102A, 102B or 102C should be backed up or otherwise recorded in one of backup systems 110 at least once.

Policy II may indicate that a server 102 should be connected to at least 2 switches 106.

Policy III may indicate that all host bus adaptors (HBAs) 103 should be in use, where to be in use may mean being connected to a switch 106 or another fiber channel device such that data is capable of and actually running over such HBA 103.

Policy IV may indicate that each storage array 104 should be connected to at least 2 switches 106.

Policy V may indicate that a storage device 150 should be mapped to at least one storage port 105 and masked to at least one HBA 103, where mapping a storage device 150 to a storage port 105 may mean providing access or permitting access to such device through the port 105, and where masking a storage device 150 to an HBA 103 may mean giving permission to such device to gain access from the specific HBA 103.

Policy VI may indicate that a storage device 150 presented to a specific server 102 should be presented through at least two HBAs 103. Presentation of storage device 150 to a server 102 may be called masking, and may include an association of components such as for example a storage array 150 and an HBA 103, so that the storage device 150 and for example a server 102 that is connected to an HBA 103 may share and exchange information.

Policy VII may indicate that each fiber channel zone 140 should include only active components that are connected to a switch 106, which have a connection or link path between them so that they are physically connected through one or more switches 106. A zone 140 may indicate that components that are connected through same a switch 106A are permitted to establish connections between each other.

Policy VIII may indicate that an element (such as for example HBA 103 or Storage Port 105) connected to a switch 106 should be part of existing zone 140.

Other policies are possible such as those that may relate to one or more of the sets of objects listed above or that may relate to other sets of objects on an IT infrastructure. For example, various policies may relate to a desired redundancy of services that are supplied on an IT infrastructure, such as a requirement that a storage array be connected to at least two switches to make sure that a failure of one switch will not impair a flow of data from the storage array. Policies may relate to other factors such as optimization of usage of components, security, bandwidth utilization, channel efficiency or other measures. Some discrepancies from compliance with a policy may trigger an alert from processor 118, to for example an IT manager or other administrative function, that may be conveyed for example by a warning signal or alarm that a malfunction has occurred. Other policies may be presented as part of an analysis of a structure or efficiency review of an IT infrastructure. A policy violation may indicate that for example a particular service, link, connection, or configuration on an IT infrastructure is not configured in accordance with one or more policies. In some embodiments, one or more policies may be stored in for example a memory, and a criteria of the policy may be applied by a processor to one or more components, connections or services to evaluate, determine or confirm that such components, connections or services match of comply with such policy, or alternatively highlight, signal or provide an alert of an non-compliance or discrepancy with a policy by a particular component or configuration. Certain policy violations may trigger an automated fix, shutdown or other action relating to the non-compliance, such as a compensation or remedy for the non-compliance. In other embodiments, an indication or identification of a non-compliance, including for example an identity of the non-compliant component or connection as well as the violated policy, may be accompanied or followed by a suggestion of a remedy or fix for the non-compliance.

Reference is made to FIG. 3A, a table identifying members of a first set, class or category of objects of the IT infrastructure that are to receive a particular service from another or second set or class of components on the IT infrastructure in accordance with an embodiment of the invention. A processor such as processor 118 may collect, compile, map or populate a list, table or set of the one or more members of a category such as servers 102, and may store such list, table or set in for example memory 116 that includes servers 102A, 102B, and 102C.

Reference is made to FIG. 3B, a table identifying members of a second class or category of objects of the network infrastructure, and indicating a result of a check of the services provided by such objects and the objects receiving such services. As is shown in FIG. 3B, processor 118 may prepare, compile or populate a list, set or table of all or some of the BUSYS 110 connected to a IT infrastructure. Processor 118 may collect information on the servers 102 that are backed up or otherwise recorded or stored by the respective BUSYS 110, which may indicate for example, that BUSYS 110A backs up server 102A and that BUSYS 110B backs up server 102C.

Reference is made to FIG. 3C, a table showing a result of a comparison of the items in the first class as are mapped in FIG. 3A, and the indication or identity of the objects providing the service, in this case back up services, by components in the second class, in this case BUSYS 110 as is shown in FIG. 3B, in accordance with an embodiment of the invention. For example, a comparison of the entries in FIG. 3A and the components in FIG. 3B that are recorded or mapped as receiving back up services, shows a non-compliance with Policy I in respect of the backing up of server 102B, since server 102B does not seem to be backed up by any of BUSYS 110. Indications of non-compliance with a policy may be reported to a user of for example device 114 or otherwise addressed.

Reference is made to FIG. 3D, a mapping or recording of servers 102 and the FS 101 that are stored on such servers 102, and to FIG. 3E, showing the FS 101 stored on the respective BUSYS 110, and to FIG. 3F, a table of discrepancies, showing the FS 101 that are not backed up on BUSYS 110, in accordance with an embodiment of the invention. FIG. 3D indicates the FS 101 that are stored on the relevant servers 102. FIG. 3E shows the BUSYS 110 and the FS 101 that are backed up on each of them. FIG. 3F shows the discrepancies or non-compliance from Rule I and Ia by indicating the FS 101 that are not backed up by a BUSYS 110.

Reference is made to FIGS. 4A, 4B and 4C, tables showing results of a check, cross check and comparison of compliance with Policy II from FIG. 2, in accordance with an embodiment of the invention. Policy II dictates that a server 102 should be connected to at least two switches 106. FIG. 4A shows a mapping of servers 102 that are part of an IT infrastructure, such as 102A, 102B and 102C. Processor 118 may query servers 102 and switches 106 to learn and identify the switches 106 that provide switching services to each of such servers 102. FIG. 4B show a cross check of Policy II, in the form of a mapping of the switches 106 of the IT infrastructure and the direct and indirect connections of such switches 106 that end in a connection to a server 102. In FIG. 4B such path of connections from switch 106 to server 102 includes a port 108, an HBA 103 and finally a server 102. In some embodiments, a check may include determining which particular components from a first class or set of components receives a service from a particular component in a second class or set of components. A cross check may include determining which components receive the service from which components in the other class. In some embodiments, combinations of connections among components may be mapped and the results of such mappings may be combined to collect data about a service provided by one component of set of components to another component or set of components. For example, FIG. 5A shows a connection of servers 102 to HBA's 103, and data from a mapping of the connections of HBA's 103 may be combined with other data to indicate one or a series of connections and services provided by and between components. FIG. 4C indicates that each of server 102A and 102C are connected to only one switch 106. Such connection to only switch may violate the policy of Policy II, and an alert or indication of such violation may be provided.

Reference is made to FIGS. 5A, 5B, 5C and 5D, tables showing results of a check, cross check and comparison of compliance with Policy III from FIG. 2, in accordance with an embodiment of the invention. Policy III dictates that all HBAs 103 should be in use, or actually available or used for the transmission of data or signals. FIG. 5A may represent a check of servers 102 to determine which HBA's 103 such servers are connected to. FIG. 5B and FIG. 5C may represent a check or cross check of switches 106 and servers 102, respectively to determine the connections that form the links between each of such switches 106, on the one hand, and the servers 102 and storage arrays 104, on the other hand. For example, as is shown in FIG. 1, switch 106A is connected to server 102A through HBA 103A and to server 102B through HBA 103C. Switch 106A connects to storage array 104 through storage port 105A. Switch 106B is connected to server 102B through HBA 103D and is connected to server 102C through HBA 103E and 103F. This cross check indicates that although HBA 103B appears on the mapping of HBA's 103 in that it is connected to a server 102, it does not appear on the cross check of HBA's 103 that are part of a connection of a server 102 to a switch 106 to a storage array 104. FIG. 5D shows this discrepancy.

Reference is made to FIGS. 6A and 6B, tables showing results of a check, cross check and comparison of compliance with Policy IV from FIG. 2, in accordance with an embodiment of the invention. The Policy IV dictates that each storage array 104 should be connected to at least two switches 106. FIG. 6A presents the result of a mapping of storage arrays 104 and the storage ports 105, ports 108 and switches 106 to which each of such arrays 104 is connected, whether directly or indirectly. FIG. 6A may also be read in reverse (i.e. from right to left) as a cross check of the storage arrays 104 to which each of switches 106 is connected. FIG. 6B indicates that storage array 104B is connected to only one switch 106B, representing a discrepancy from Policy IV from FIG. 2.

Reference is made to FIGS. 7A and 7B, tables showing results of a check, cross check and discrepancies of compliance with Policy V from FIG. 2, in accordance with an embodiment of the invention. Policy V dictates that each storage device 150 should be mapped to at least one storage port 105 and masked to at least one HBA 103. FIG. 7A presents a result of inquiries posed to or about one or more of the storage arrays 104 and storage devices 105 within such arrays about mapping and masking of such devices 105 and arrays 104. FIG. 7A indicates that device 150A is not mapped to any storage port 105. A cross check for Policy V may inquire of all, some or one of the HBAs 103 and the storage ports 105 to determine which storage arrays 104 and storage devices 150 are listed in their respective masking and mapping configurations. FIG. 7B indicates the result of a cross check for Policy V as well as Policy III and IV. In some embodiments, a check or cross check of services provided to or by one or more components may be based on connections or services provided by two or more classes of components. For example, as is shown in FIG. 7B, storage device 150F may be masked to HBA 103B, but a further check of HBA 103B indicates that such HBA 103B is not connected to any switch 106. A combination of the mapping of services provided by a chain of components in different classes or sets of components, and a cross check of the services received by such components may allow a confirmation that services which are thought to be provided are in fact received by the targets of such provided services.

Reference is made to FIGS. 8A and 8B tables showing results of a check, cross check and discrepancies of compliance with Policy VI from FIG. 2, in accordance with an embodiment of the invention. Policy VI dictates that a storage 150 device presented to specific server 102 should be presented through at least two HBAs 103. In FIG. 8A a mapping may be assembled of one, some or all of the servers 102 that are part of the IT infrastructure, and a connection of such servers to HBAs 103. In FIG. 8B, a cross check that may be relevant to one or more of Policy VI, V, III & IV may evaluate or map the series of connections from one or more storage devices 150 to servers 102. As is shown in FIG. 8B and in FIG. 1, such mapping indicates that the connections of for example storage device 150B through storage port 105B, to port 108G, to switch 106B, to port 108C, to server 102B yields only one HBA 103D that presents storage device 150B to server in violation of Policy VI.

Figure 1B:
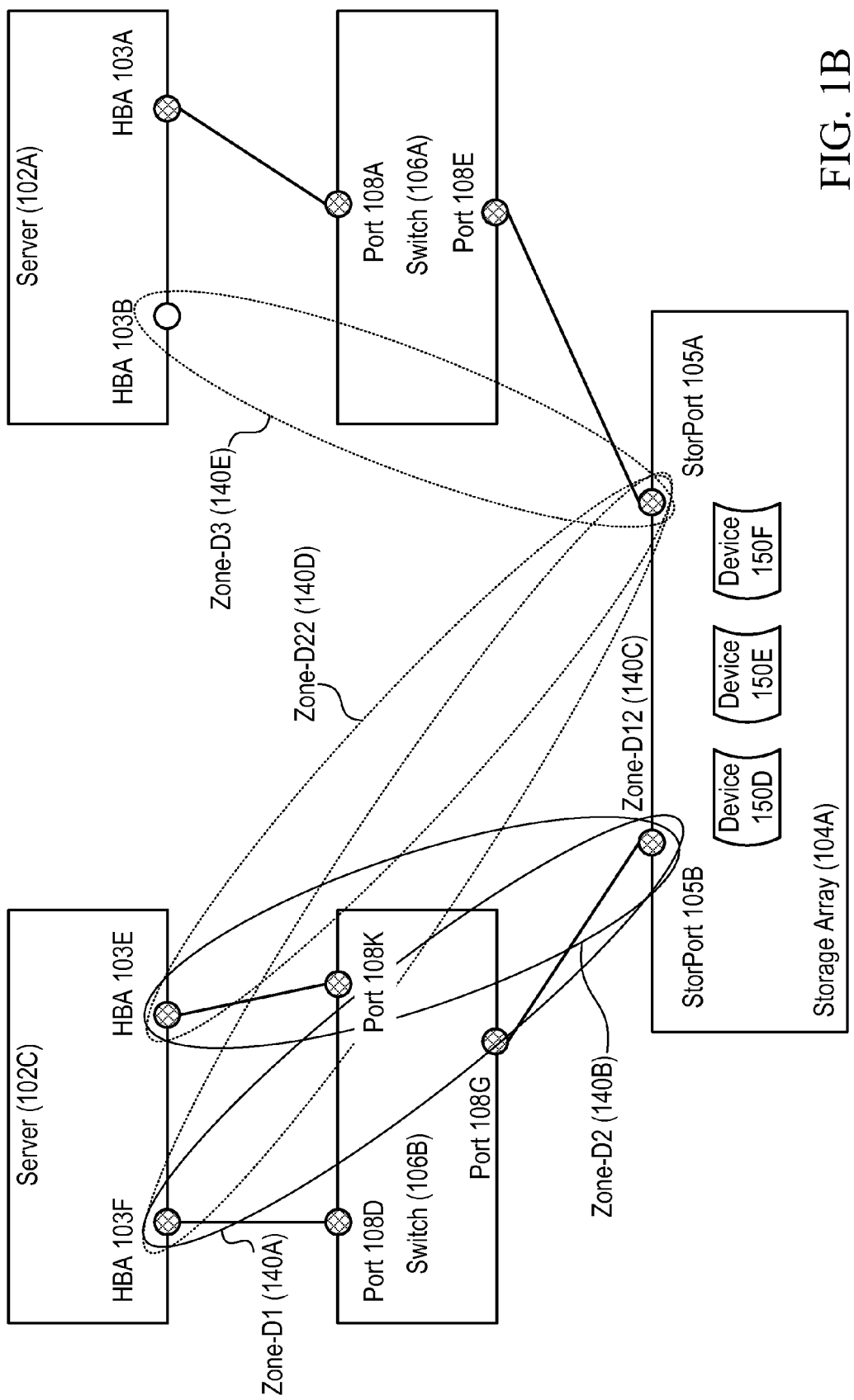
FIG. 1B is a view of connections and fiber channel zones of an IT infrastructure of FIG. 1A, in accordance with an embodiment of the invention.

Reference is made to FIG. 1B, a schematic diagram presenting a view of an IT infrastructure such as the one in FIG. 1A, displaying elements and designation of zones of such elements, and to FIGS. 9A and 9B, tables showing results of a check, cross check and discrepancies of compliance with Policy VII from FIG. 2, in accordance with an embodiment of the invention. Policy VII dictates that (elements that are connected to a switch 106 (whether directly or indirectly)), such as HBA's 103 and storage ports 105, that are in a same zone 140 should include only active elements, and that such active elements should have a connection path between them. In FIG. 9A, a table may be assembled mapping some or all of the zones 140 in the IT infrastructure and indicating which storage ports 105 and HBAs 103 are part of a same zone 140. In FIG. 9B, the results of a cross check of elements included in zones 140 may indicate that certain of the elements, such as HBA 103A and storage port 105A in zone 140C do not have a connectivity path between them. Further, as is shown in FIG. 9B, HBA 103B which is part of zone 140E is not connected at all. An alert may be issued of such discrepancies from the dictates of Policy VII.

Continuing with the schematic diagram in FIG. 1B, reference is made to FIG. 10A, a table showing results of a check, cross check and discrepancies of compliance with Policy VIII from FIG. 2, in accordance with an embodiment of the invention. Policy VIII dictates that an element (HBA 103 or Storage Port 105) that is connected to a switch 106 should be part of existing zone 140. FIG. 10A shows a mapping of elements such as HBA's 103 and storage ports, and an indication or identity of zones 140 of which such elements are a part. FIG. 9B shows a result of a cross check of Policy VIII where the elements that are connected to each zone 140 were checked and a comparison made between the elements and their zones from FIG. 10A, and an indication of the zones 140 and their respective member elements was recorded or defined in for example an index of a fiber channel fabric, and that such zone is defined for purposes of data transmission and access on an IT infrastructure. For example, FIG. 9B shows that HBA 103A is connected but is not part of any zone 140. An alert may be issued of such discrepancies from the dictates of Policy VIII.

Figure 11:
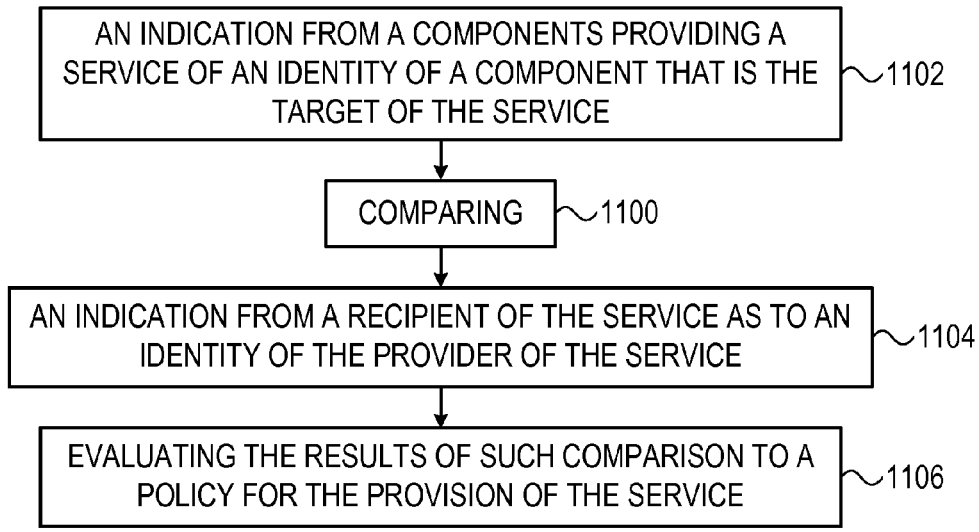
FIG. 11 is a flow diagram in accordance with an embodiment of the invention.

Reference is made to FIG. 11, a flow diagram in accordance with an embodiment of the invention. Embodiments of the invention may include a method of evaluating compliance with a policy for a service provided by objects on an IT infrastructure. Embodiments of such a method may include, as is shown in block 1100, comparing, as is shown in block 1102, an indication provided by a component or object that is a provider of a service as to the identity of a component that is the target of the service, to an indication, as is shown in block 1104 provided by a recipient component of the service as to an identity of the provider of the service. In block 1106, a method may evaluate such comparison and determine that a result of such comparison to a policy for the provision of the service.

Figure 12:
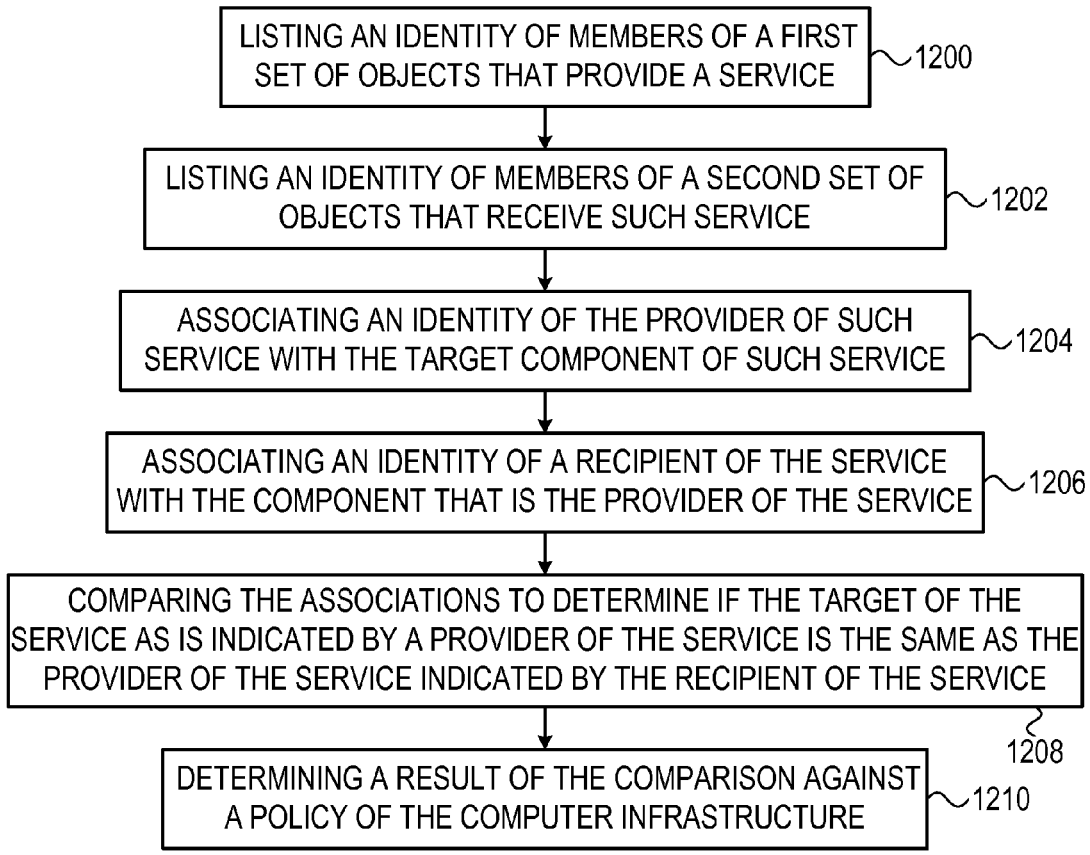
FIG. 12 is a flow diagram in accordance with an embodiment of the invention.

Reference is made to FIG. 12 a flow diagram of a method in accordance with an embodiment of the invention. In block 1200, a list may be compiled of members of a first set of objects of a computer infrastructure. The list may include an identity of one, some or all of the member components of such set and the service that is provided by such components. In block 1202, a list may be compiled of members of a second set of objects of the infrastructure, that includes an identity of some or all of the member components in such set and the relevant service received by such component from members of the first set. In block 1204 a first set of associations may be developed or recorded indicating the identity of the component in the second set that is the target of the service provided by each member of the first set of components. In bock 1206, a second set of associations may be developed or recorded indicating a recipient component in the second set of component of a service, and the identity of the component in the first set that provides such service to the recipient. In block 1208, a comparison may be made between the first set of associations and the second set of associations. Such comparison may seek to determine whether the target of the service as is indicated by a provider of such service is the same as the, provider of a service indicated by the recipient of such service. In block 1208, an evaluation of such comparison may be made against a policy that is applicable to the computer infrastructure.

Figure 13:
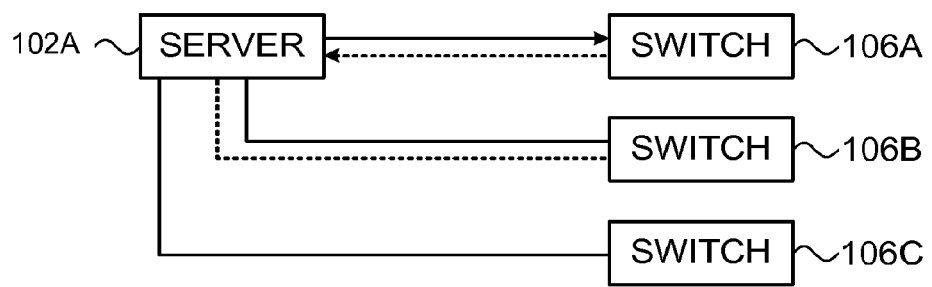
FIG. 13 is a schematic diagram of visible connections or links between components, signifying or representing a provision and receipt of a service between the components in accordance with an embodiment of the invention.

Reference is made to FIG. 13 a schematic diagram of visible connections, such as lines, colored lines, or other visible indications of a relationship or association, between components, signifying or representing a provision and receipt of a service between the components in accordance with an embodiment of the invention. In some embodiments a visible presentation may include for example a graphical presentation that may be shown on for example a monitor, display or screen, that may map, show or highlight one or more of a connection, service, or configuration between and among components on an IT infrastructure. An embodiment of the invention may allow a visible, graphic presentation of a service provided by a first component of a first class of objects to a designated first component of a second class of objects, and a service received by the first component of the second class from a component in the first class. Such graphic presentation may include or rely upon a series of colored lines, dashed lines, arrowed lines or other indications of a service or designated service from a first component to a second components and a receipt of such service by the second component. In some embodiments, a visible or graphic presentation may be shown or mapped on for example a screen or monitor that indicates or more components, classes of components, connections, services or other configurations of the IT network. A user may select for example a class of components, and a service or connection relating to such components. A visible or graphic presentation may be displayed to the user, showing one or more of the selected components, as well as the service received by or provided to such components and the various connections relating to such services or components. The visible presentation may show in various colors, text or other visible signals, a status of the connections and a compliance or non-compliance of such components or connections with one or more selected policies. For example, and referring to for example FIGS. 4A and 4B, a graphical depiction may be presented that shows servers 102 and switches 106, and for example the ports 108 and HBA's 103 by which they are connected. Under Policy II, each server 102 should be connected to at least two switches 106. In operation, a user may place a mouse or other input device on a graphic representation of a server 102. A colored line of a first color, such as yellow may be generated to represent the connections between such server 102 and the switches 106 to which the server is connected, based on the information for example, such that the colored line of the first color from server 102A will reach to switch 106A and switch 106B, in accordance with FIG. 4A, since server 102A reports that it is receiving switching services from switch 106A and switch 106B. A colored line of a second color, such a blue may connect switches 106A and 106B to switch 102A to indicate that such switches reports that it is providing switching services to such server. In the event that the reported provider of the server and the reported recipient of the service correspond, then the two line colors may overlap and present a third color such as green. If there provider and recipient of the services do not overlap or there is a discrepancy in the satisfaction of a policy, such as that between server 102A and switch 106C, then a single color may remain. The colors of the graphic presentation may provide a visual indication of a compliance or a non-compliance with a policy, where such indication shows the component that is in non-compliance and whether such non-compliance relates to a provision or receipt of a service, and the object or subject component of such non-compliant service. Different formats or display methods may be used to display connections or other aspects of a graphic representation. A format may be for example, color, pattern, shading, line thickness, line format (e.g., form of line, dotted, dashed, different sizes of dashes, etc.). A format may be a method of differentiating objects such as connections, lines, equipment, etc., from each other when displayed or graphed. In some embodiments various kinds of line formats, such as dashed, dotted and solid line formats may be used in place of a first and second color, so that a compliance of components is presented as for example a solid line, and a non-compliance is presented as a dashed or dotted line. Arrows or other visual indicators may also be used to show a direction of a recipient or provider of a service.

In some embodiments, the visible connection of for example a first color between the component that is indicated as being a provider of the service may connect to the component indicates as being the recipient of such service. A visible connection of for example the second color may connect the components that are indicated by the provider component as being the provider of the service. If the indicated recipient matches the indicated provider, for example in satisfaction of a particular policy, the visible connection may be presented in a third format.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

It will be appreciated by persons skilled in the art that embodiments of the invention are not limited by what has been particularly shown and described hereinabove. Rather the scope of at least one embodiment of the invention is defined by the claims below.

We claim:

1. A method of evaluating compliance with a policy for a service provided by components of a computer network infrastructure, said method comprising:
   querying by a processor a first component of a first set of components of a computer network about an identity of a target of a service, said service provided by said first component of said first set of components of the computer network;
   querying by said processor a first component of a second set of components or said computer network about an identity of a provider of said service to said first component of said second set of components of the computer network;
   collecting from said first component of said first set of components of a computer network, an identity of a target of said service, said service provided by said first component of said first set of components of the computer network;
   collecting from said first component of said second set of components of the computer network, an identity of a provider of said service to said first component of said second set of components of the computer network;
   determining from
      said identity of said target of said service as was collected from said provider of said service and from
      said identity of said provider of said service as was collected from said target of said service,
         whether a relationship between said target and said provider corresponds with a policy for said service on said computer network infrastructure, and
      triggering an alert of a violation of said policy in response to determining that a relationship between said target and said provider does not correspond with a policy for said service on said computer network infrastructure.

2. The method as in claim 1, further comprising:
   collecting an identity of all members of said first set of components on said computer network infrastructure; and
   collecting an identity of all members of said second set of components on said computer network infrastructure.

3. The method as in claim 1,
   wherein said first set of components comprises servers,
   wherein said second set of components comprises backup systems,
   wherein said service comprises a recording of a server of said servers in a backup system of said backup systems, and
   wherein said policy indicates each server of said servers is to be recorded in a backup system of said backup systems.

4. The method as in claim 1,
   wherein said first set of components comprises files in a file server,
   wherein said second set of components comprises backup systems,
   wherein said service comprises backing up of a file, and
   wherein said policy indicates that files in a file server are to be backed up.

5. The method as in claim 1,
   wherein said first set of components comprises servers,
   wherein said second set of components comprises switches,
   wherein said service comprises connection of a server of said servers to at least one switch of said switches, and
   wherein said policy indicates that a server is to be connected to at least two switches.

6. The method as in claim 1,
   wherein said first set of components comprises host bus adaptors,
   wherein said second set of components comprises switches,
   wherein said service comprises use by a switch of a host bus adaptor on said computer infrastructure, and
   wherein said policy indicates that all host bus adaptors on said network infrastructure are to be in use.

7. The method as in claim 1,
   wherein said first set of components comprises storage arrays,
   wherein said second set of components comprises switches,
   wherein said service comprises connection of a storage array to a switch; and
   wherein said policy indicates that a storage array is to be connected to two switches.

8. The method as in claim 1, further comprising:
   collecting from a first component of a third set of components, an identity of a target of a second service, said second service provided by said first component of said third set of components;
   collecting from a first component of a second set of components, an identity of a provider of said service to said first component of said second set of components;
   comparing:
      said identity of said target of said second service as said identity was collected from said first component of said third set of components,
      to said identity of said provider of said second service, as said identity was collected from said first component of said second set of components.

9. The method as in claim 8,
   wherein said first set of components comprises storage devices,
   wherein said second set of components comprises storage ports,
   wherein said third set of components comprises host bus adaptors,
   wherein said first service comprises mapping a storage device to a storage port, and
   wherein said second service comprises masking a storage device to a host bus adaptor, and wherein said policy indicates that a storage device is to be mapped to at least one storage port and is to be masked to at least one host bus adaptor.

10. The method as in claim 8,
    wherein said first set of components comprises storage devices,
    wherein said second set of components comprises servers,
    wherein said third set of components comprises host bus adaptors,
    wherein said first service comprises presentation of storage devices to servers, wherein said second service comprises presentation of storage devices to servers through host bus adaptors, and wherein said policy indicates that a storage device is to be presented to a server through at least two host bus adaptors.

11. The method as in claim 8, wherein said first set of components comprises host bus adaptors and storage ports, wherein said second set of components comprises switches, wherein said third set of components comprises fiber channel zones, wherein said first service comprises connection to a switch of a member of said first set of components, wherein said second service comprises participation in a zone of a member of said first set of components, and wherein said policy indicates that a member of said first set of components that is connected to a switch is to be part of a fiber channel zone of said fiber channel zones.

12. The method as in claim 1, wherein said first set of components comprises fiber channel zones on said network infrastructure, wherein said second set of components comprises storage ports and host bus adaptors;

wherein said service comprises a connection path between storage ports and host bus adaptors in a fiber channel zone of said fiber channel zones, and wherein said policy indicates that active storage ports and host bus adaptors in a fiber channel zone are to be connected by a connection path.

13. A method of evaluating a service provided by a component of a computer network infrastructure, comprising:

compiling, by a processor a first list of a first set of components of said computer infrastructure, said first list including components providing a service on said infrastructure;

compiling, by the processor a second list of a second set of components, said second list including components receiving said service on said infrastructure;

compiling, by the processor a first set of associations, said first set of associations indicating an identity of a target component of said service provided by a first component in said first set to a first component in said second set, wherein said target identity is collected from said first component of said first set of components;

compiling, by the processor a second set of associations, said second set of associations indicating an identity of an component providing said service to said first component in said second set of components, wherein said identity of said component providing said service to said first component in said second set of components is collected from said first component of said second set of components;

determining from
said identity of said target of said service as was collected from said first component of said first set of components and from
said identity of said component providing said service as was collected from said first component of said second set of components,
whether a relationship between said target and said component providing said service corresponds with a policy for said service on said computer network infrastructure, and triggering an alert of a violation of said policy in response to determining that a relationship between said target and said component providing said service does not correspond with a policy for said service on said computer network infrastructure.

14. The method as in claim 13, wherein said first set of components comprises servers, said second set of components comprises backup systems and wherein said service comprises recording said servers in said backup systems.

15. The method as in claim 13, wherein said first set of components comprises files in a server, said second set of components comprises backup systems and wherein said service comprises backup of a file in a server.

16. A system comprising:

a memory to store
an identity of members of a first class of components on an computer network infrastructure,
an identity of members of a second class of components on said computer network infrastructure;
an indication of a service received by a first member of said first class from a member of said second class; and
an indication of a service provided by a first member of said second class to a member of said first class; and a processor, said processor configured to:
collect from a first member of said first class of components, an identity of a target of said service, said service provided by said first member of said first class;
collect from a first member of said second class of components, an identity of a provider of said service to said first member of said second class;
determine from
said identity of said target of said service as was collected from said first member of said first class of components and from
said identity of said provider of said service as was collected from said first member of said second class of components,
whether a relationship between said target and said provider corresponds with a policy for said service on said computer network infrastructure, and
trigger an alert of a violation of said policy in response to determination that a relationship between said target and said provider does not correspond with a policy for said service on said computer network infrastructure.

17. The method according to claim 1, further comprising suggesting a remedy for the automatically identified non-compliance.

18. The method according to claim 1, wherein the first component of the first set of components of the computer network, and the first component of the second set of components of the computer network are selected from a list consisting of: servers, data storage devices, backup systems, processors, ports, switches, and private branch exchange (PBX).

* * * * *